United States Patent [19]
Naing et al.

[11] Patent Number: 5,853,912
[45] Date of Patent: Dec. 29, 1998

[54] LITHIUM ION ELECTROCHEMICAL CELL WITH SAFETY VALVE ELECTRICAL DISCONNECT

[75] Inventors: Htun S. Naing, Cockeysville, Md.; David Shapiro, Valdese, N.C.

[73] Assignee: SAFT America, Inc., Valdosta, Calif.

[21] Appl. No.: 677,961

[22] Filed: Jul. 10, 1996

[51] Int. Cl.⁶ .................................................. H01M 2/00
[52] U.S. Cl. .................................................. 429/61; 429/53
[58] Field of Search ........................................ 429/53, 61

[56] References Cited

U.S. PATENT DOCUMENTS

| | | |
|---|---|---|
| 4,788,112 | 11/1988 | Kung . |
| 4,855,195 | 8/1989 | Georgopoulos et al. . |
| 4,943,497 | 7/1990 | Oishi et al. . |
| 4,975,341 | 12/1990 | Tucholoski et al. . |
| 5,376,467 | 12/1994 | Abe et al. . |
| 5,405,715 | 4/1995 | Dawson et al. . |
| 5,418,082 | 5/1995 | Taki et al. . |
| 5,427,875 | 6/1995 | Yamamoto et al. . |
| 5,464,705 | 11/1995 | Wainwright . |
| 5,532,075 | 7/1996 | Alexandres et al. . |

FOREIGN PATENT DOCUMENTS 2099657  2/1994  Canada .
0327366  8/1989  European Pat. Off. .

*Primary Examiner*—John S. Maples
*Attorney, Agent, or Firm*—Sughrue, Mion, Zinn, Macpeak & Seas, PLLC

[57] ABSTRACT

An explosion-proof valve electrical disconnect assembly incorporates a vent valve contact disk which seals the can of a compact electrochemical cell and which faces a juxtaposed stripper contact disk welded at the center by a weld nugget at a weld point, forming a rigid, preferably increased thickness, mass. The underlying stripper contact disk is weakened about the weld point, surrounding the weld nugget to ensure pull-through of the stripper contact disk portion immediately adjacent to the weld connection to effect initial electrical separation of the two contact disks. Subsequent rupture of the vent valve contact disk releases high pressure gas internally from the cell. A semi-rigid assembly cup may support a rigid grommet functioning to sandwich the vent valve contact disk and the stripper contact disk facilitated by crimping of the can top about a deformable L-shaped cross-section annular assembly cup. A current responsive PTC element forms a second circuit breaker independent of the first mechanical circuit breaker formed by the two contact disks.

13 Claims, 4 Drawing Sheets

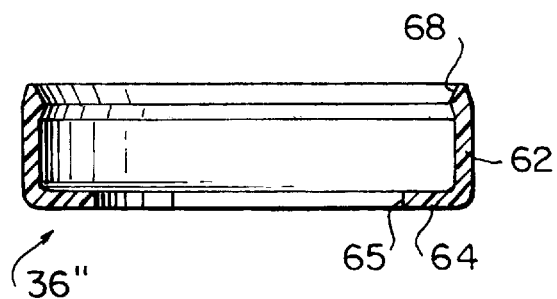
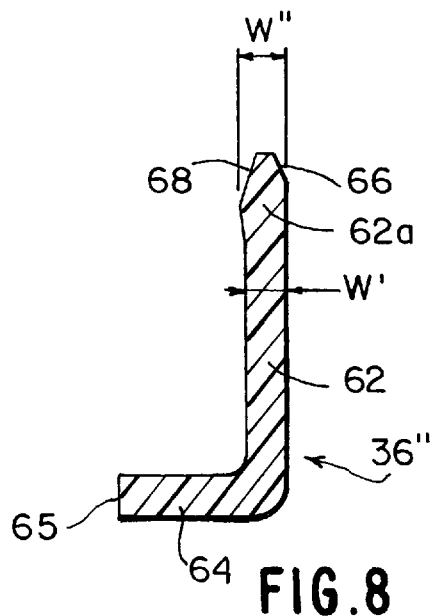
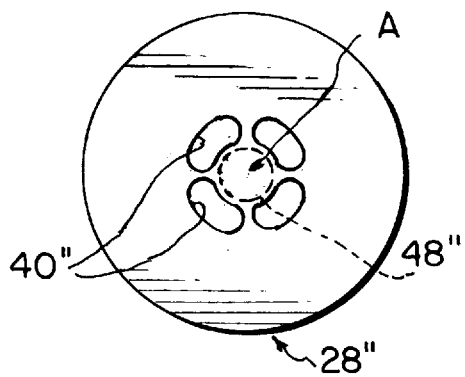
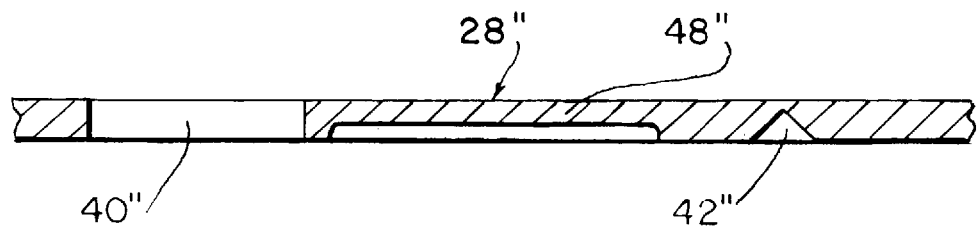

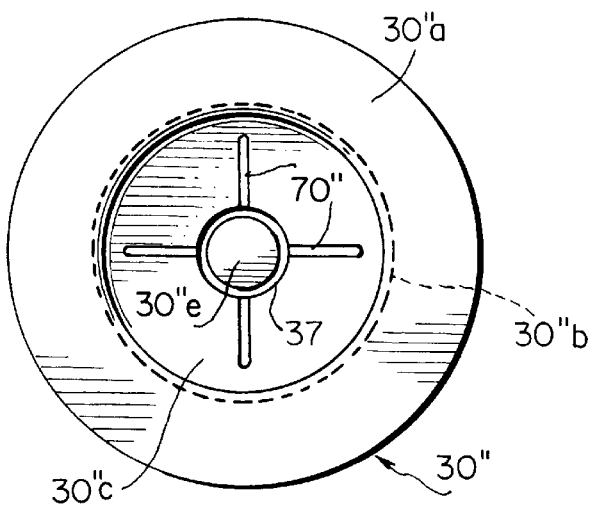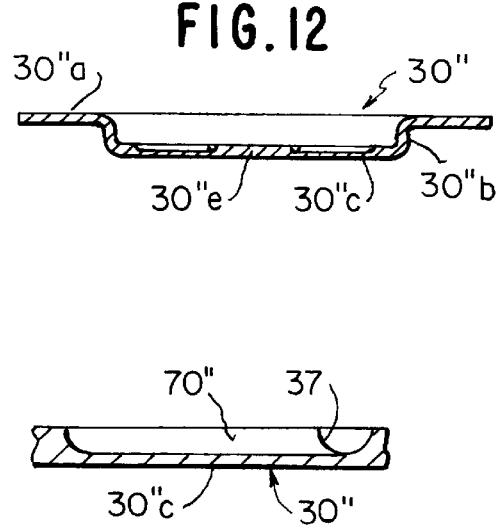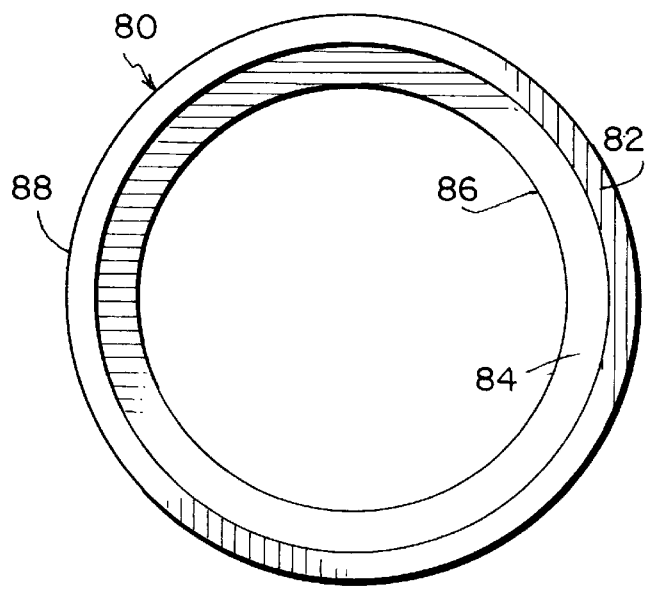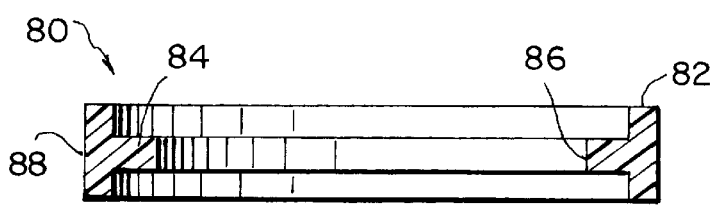

LITHIUM ION ELECTROCHEMICAL CELL WITH SAFETY VALVE ELECTRICAL DISCONNECT

FIELD OF THE INVENTION

This invention relates to electrochemical cells, and more particularly to a lithium-type electrochemical cell having an explosion-proof structure which functions to break the electrical circuit to the cell anode or cathode prior to rupturing of a deformable sealing diaphragm closing off the cell can or container.

BACKGROUND OF THE INVENTION

Chemical changes in the generating unit of electrochemical cells, particularly lithium cells, increase excessively the internal pressure within the cell and may result in an explosion. Such explosion may be caused by an excessively high current, or as a result of excessive charging of the cell beyond the recommended potential. The electrolyte within the cell may decompose to generate gas which upon filling up the cell increases the internal pressure to such extent that an explosion results.

Explosion-proof safety devices in the form of a rupturable cover or diaphragm permit the internal pressure to be relieved by venting the gas to the atmosphere. To further prevent such explosion of a cell, such safety devices may also incorporate a disconnect or circuit breaker for terminating an electrical circuit to the cell anode or cathode.

U.S. Pat. No. 4,943,497 is directed to an electrochemical cell having an electrical current cutoff valve, in which the valve is deformable upon increase of inner pressure to a first level to initially sever a connection lead which connects the valve with a generator unit contained within the cell. In such cell, the supply of charging current is cut off when the inner pressure of the cell has been abnormally increased. At a higher internal pressure level, a deformable and rupturable diaphragm vents the high pressure gas to the exterior of the cell container or can.

In U.S. Pat. No. 4,943,497, an anode tab is welded to a stripper contact disk welded at its center to a deformable vent valve contact disk. The weld between the center of the vent valve contact disk and the stripper contact disk is severed when the internal pressure reaches a first level. After disrupting of the electrical current path between the anode and the charging circuit, if the internal pressure continues to rise to a second level, the vent valve contact disk ruptures releasing electrolyte to the atmosphere through vent holes within an overlying cover of the cell. The stripper contact disk tears at the weld from the vent valve contact disk. The assembly is suspended between a unitized insulator which also maintains structural support for the assembly.

Such structural arrangement, while effective to provide a two-step operation, the first of which ensures termination of the electrical circuit to the anode or cathode and the second to rupture the seal of the container or can and vent the internal high pressure gas and thereby prevent an explosion of the cell itself, is complicated and uses a specially formed separate anode tab connection to a valve diaphragm which significantly increases the assembly time in completion of the cell.

Canadian Application 2,099,657 filed Jun. 25, 1993 and published Feb. 11, 1994 is directed to an electrochemical cell and method of manufacturing the same. It also provides an electrochemical cell with a combined electrical current cutoff and vent safety valve device. A conical shaped diaphragm is spot welded at its center to an underlying stripper contact disk capable of quick movement to an oppositely inverted V-shaped position rupturing the weld and severing the electrical connection between these electrically conductive components of the assembly. The underlying stripper contact disk is recessed in its center opposite the weld connection to the diaphragm.

SUMMARY OF THE INVENTION

The present invention is directed to an improved combined safety valve and electrical disconnect for effectively venting an electrochemical cell while initially functioning as a circuit breaker to terminate an internal electrical circuit within a battery capable of creating an internal gas pressure which ultimately leads to an explosion of the cell, absent gas venting. The invention employs a deformable vent valve contact disk which is welded directly to a specially designed, stamped stripper contact disk weakened position, with a weld nugget effected between the facing surface of the vent valve contact disk and the weakened center of the stamped stripper contact disk. The weld nugget severs the thinner of the two contact disk materials. By increasing the wall structure or thickness of the vent valve contact disk or by weakening the center of the stripper contact disk, the nugget pulls through the stripper contact disk allowing the vent valve contact disk to remain intact until a higher level of gas pressure is generated to ultimately rupture the vent valve contact disk and vent the electrolyte to the atmosphere. A pancake type PTC (positive temperature coefficient) element may overlie the vent valve contact disk, functioning as a circuit breaker responsive to excessive current buildup.

As a further feature, the present invention permits the ultrasonic welding of the anode tab to the valve vent disk during assembly, with a weld nugget tab stamped out of the stripper contact disk for direct attachment thereto. This minimizes assembly operations and provides the necessary conditions for facilitating welding ultrasonically. The invention ensures against possible ignition where ultrasonic welding replaces the more conventional resistance welding. The pull-through of the weld nugget is facilitated by weakening an area within the stripper contact disk about the weld nugget, at the weld point and/or by thinning the stripper contact disk by way of a recess within one face of the stripper contact disk at the weld point.

BRIEF DESCRIPTION OF THE DRAWINGS

FIG. 7 is a sectional view of the assembly cup of FIG. 6.

FIG. 8 is an enlarged sectional view of a portion of the assembly cup of FIG. 6.

FIG. 9 is a top plan view of a stripper contact disk forming a component of the cell of FIG. 5.

FIG. 10 is an enlarged sectional view of a portion of the stripper contact disk of FIG. 9.

FIG. 11 is a top plan view of a vent valve contact disk forming a component of the cell of FIG. 5.

FIG. 12 is a sectional view of the vent valve contact disk of FIG. 10.

FIG. 12a is an enlarged sectional view of the central portion of the vent valve contact disk of FIGS. 11 and 12.

FIG. 13 is a top plan view of a rigid grommet forming a component of the cell of FIG. 5.

FIG. 13a is a sectional view of the rigid grommet of FIG. 13.

DESCRIPTION OF THE PREFERRED EMBODIMENT

Figure 1:
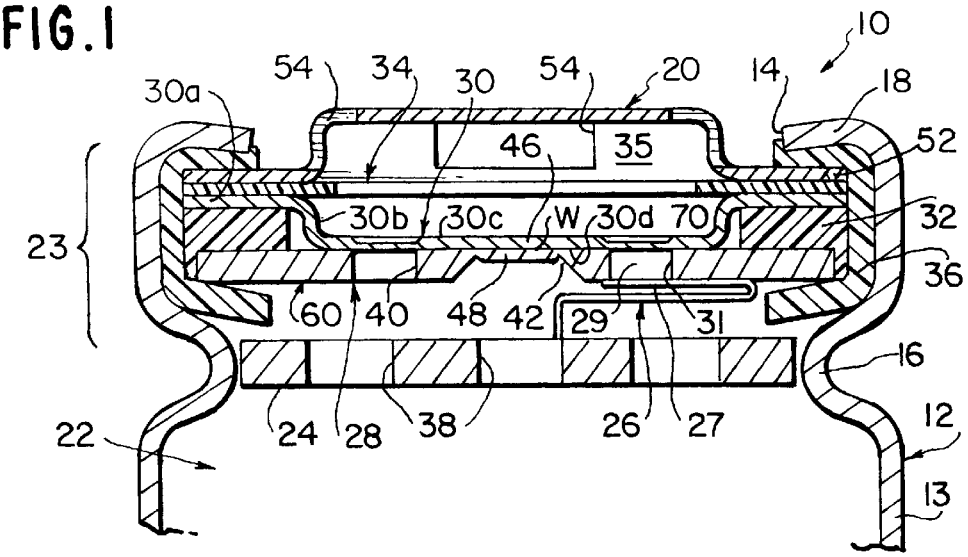
FIG. 1 is a vertical sectional view through a portion of an electrochemical cell illustrating a safety vent valve and electrical disconnect mechanism forming an explosion-proof disconnect assembly constituting a preferred embodiment of the invention, prior to cell charging.

A preferred embodiment of the present invention is described below with reference to FIGS. 1, 2 and 3.

The explosion-proof electrochemical cell forming a preferred embodiment of the invention is illustrated generally at 10 formed of a vertically upright cell can or container 12 sealed off by an end cap 20 having an annular wall 50 terminating in an outwardly directed annular flange 52. The annular sidewall 50 is provided with one or more perforations or holes 54 acting to vent the interior of the cell upon rupture of the vent valve disk indicated generally at 30. The can 12 within its sidewall 13, adjacent the top thereof, is provided with a can bead 16 below an L-shaped, annular, soft polypropylene grommet 36 which is captured between bead 16 and a crimp flange 18 which defines opening 14 within the top of the can 12. End cap 20 closes off opening 14 of can 12. A stack or assembly 23 is formed by a stripper contact disk 28, an inverted L-shaped rigid grommet 32, a vent valve contact disk 30, a PTC ring 34 and the inverted cup shaped end cap 20, in order from bottom to the top, all fitted within the L-shaped annular grommet 36. End cap 20 preferably has four circumferentially spaced vent holes 54. A generating element indicated generally at 22 of cylindrical form fills the majority of the interior of the vertically upright can or container 12, above which resides a vapor channel forming disk 24 bearing a series of spaced openings or perforations 38. Extending upwardly from the electrical generating element 22 is an aluminum anode tab indicated generally at 26 which terminates in an offset tip 27 which extends to the side of and in contact with the stripper contact disk 28. The stripper contact disk 28 is of metal provided with a series of circumferentially spaced openings at 40, permitting generated gas to pass therethrough and to enter between the upper surface of the stripper contact disk 28 and the overlying vent valve contact disk 30. As may be appreciated, the electrical circuit breaker/pressure safety valve 60 of the present invention consists primarily of a two-piece structure sandwiched within deformed L-shaped soft plastic grommet 36. The deformable, conductive metal, vent valve contact disk is being welded directly at weld point W to a reduced thickness center portion 48 of underlying stripper contact disk 28. A small mass of metal weld material couples a flat, small diameter circular area or portion 46 extending on the vent valve contact disk 30 to the center of stripper contact disk 28. Alternatively, a conical projection 46 on the lower surface of disk 30 may form a double thickness of conductive metal such as aluminum within the vent valve contact disk. By increasing the mass of material at the weld point W, the strength of the center of the vent valve contact disk is enhanced. The disk 30 is essentially of constant thickness throughout its diameter. The vent valve contact disk 30 includes a flat, horizontal, annular, peripheral portion 30a joined by annular wall 30b to offset horizontal center portion 30c. There is provided a circumferential scored groove 70 forming a weakened circular portion 30e which is subject to rupture upon gas pressurization of the interior of the cell 10 to a predefined level, well in excess of that initially destroying the connection between the vent valve contact disk 30 and the underlying stripper contact disk 28 at weld point W.

Figure 2:
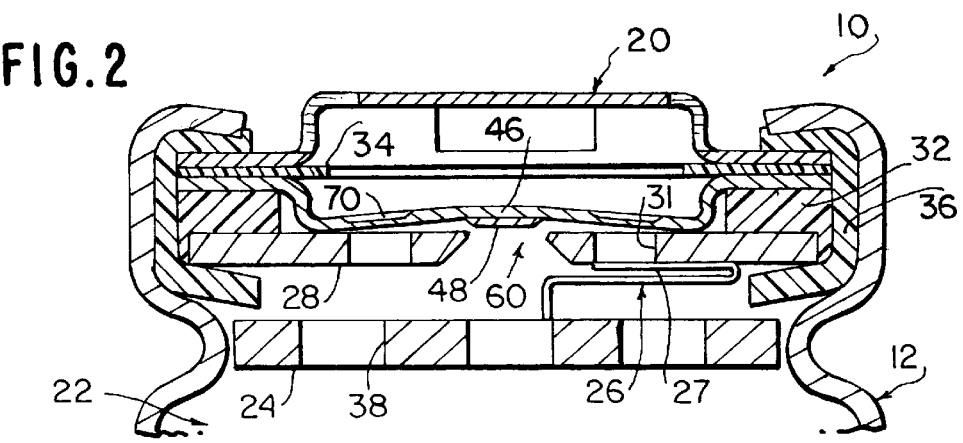
FIG. 2 is a vertical sectional view of the cell of FIG. 1 under a condition of intermediate internal gas pressure, at level causing electrical circuit disconnect by breaking away the vent valve contact disk from the underlying stripper contact disk.
Figure 3:
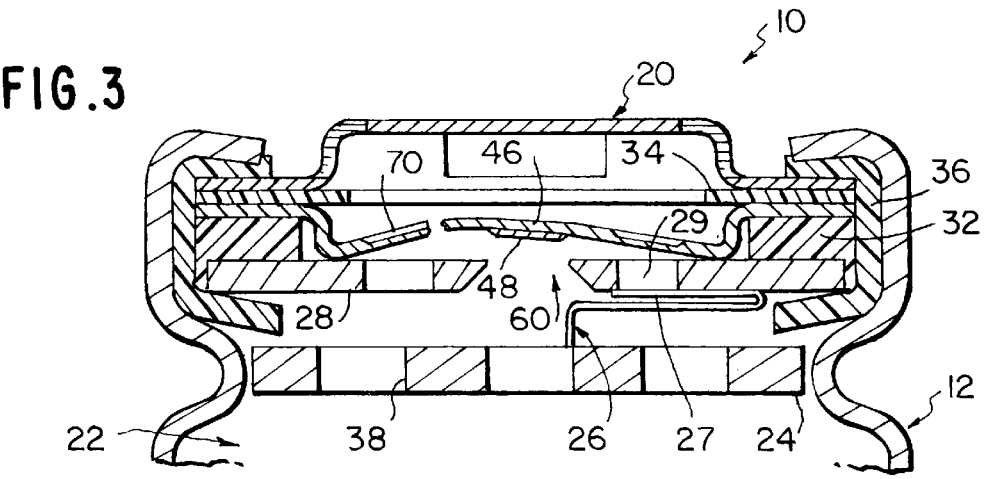
FIG. 3 is a vertical sectional view of the cell of FIGS. 1 and 2 under increased gas pressurization of the cell to the extent of rupture of the vent valve contact disk and gas venting of the cell interior.

In the illustrated embodiment of FIGS. 1–3, it is noted that the bottom of the underlying stripper contact disk 28 has a circular central recess 42, significantly diminishing the thickness of the metal disk in an area A surrounding the weld point W. Additionally there are preferably circumferentially spaced weakened areas at the junction of the recess 42 and the balance of the contact disk 28 between over the full circumference of the same. Thus, in the area of the weld point W, the vent valve contact disk 30 is considerably thicker than that of the underlying stripper contact disk 28.

End cap or cover 20 may preferably be formed of metal and may serve as the cathode terminal for the cell, with peripheral flange 52 captured within the crimped grommet 36. Perforations 54 within the end cap annular wall 50 vent space 35 between disk 30 and the end cap 20. The end cap 20 overlies the vent valve contact disk 30, which functions as one electrical contact for the circuit breaker or switch 60 formed by members 28 and 30 but is separated therefrom by PTC device 34.

In effecting the assembly of the electronic safety disconnect 10 of FIG. 1, the crimping of the upper end of the can or container 12 about the annular L-shaped cross-section grommet 36 deforms the soft grommet 36 into C-shape by deflecting the upper end 36a of the grommet 36, 90°. The crimp flange 18 and bead 16 and the end of the can 12 create a compressive force on the stack 23, thus holding the elements at rest in the position shown in FIG. 1. The weld at the bottom center of the stripper contact disk 28 ensures a low resistance electrical circuit connection between the vent valve contact disk 30 and the stripper contact disk 28. Preferably, the deformable vent valve disk is resistance welded directly to the specially designed, stamped stripper disk 28, and being welded to the upper end 27 of the aluminum anode tab 26. In addition to disks 28 and 30 forming a gas pressure operated circuit breaker, the PTC device 34 functions as a current responsive circuit breaker to disconnect the charge circuit if the current increases to a predetermined level within cell 10. The PTC device 34 may be a commercial product sold by Ray Chem Corporation under the trade name "PolySwitch".

In operation, the first embodiment, FIG. 1, prior to developing internal gas pressure acting on the contact vent disk 30, a low electrical resistance path exists from aluminum anode tab 26 to the positive potential end cap 20 via PTC element 34. In reaching a predetermined gas pressure level internally of the can, FIG. 2, the weld W will cause the weakened and/or thinned portion 48 of stripper contact disk 28 to be pulled from the thinner of the two welded disk materials, that is the underlying stripper contact disk 28. The center portion 48 pulls through the balance of the stripper contact disk 28 and breaks the stripper contact 28 at 42 and moves significantly away from the stripper contact disk 28.

When the internal pressure generated by the formation of gas increases significantly above that effecting a circuit breaker action, the radially scored or otherwise weakened portions 70 of vent valve contact disk 30 at circumferentially spaced positions ruptures as per FIG. 3 and the center portion 30c takes an inverted V-shape, that is a downwardly facing V-shape thereby moving the retained weld material and the center portion 48 of disk 28 significantly further away from the balance of the underlying stripper contact disk 28. Upon rupture of the valve contact disk 30, the relatively high pressure gas then readily escapes through the vent ports 54 within the sidewall 50 of the inverted U-shaped end cap 20.

Figure 4:
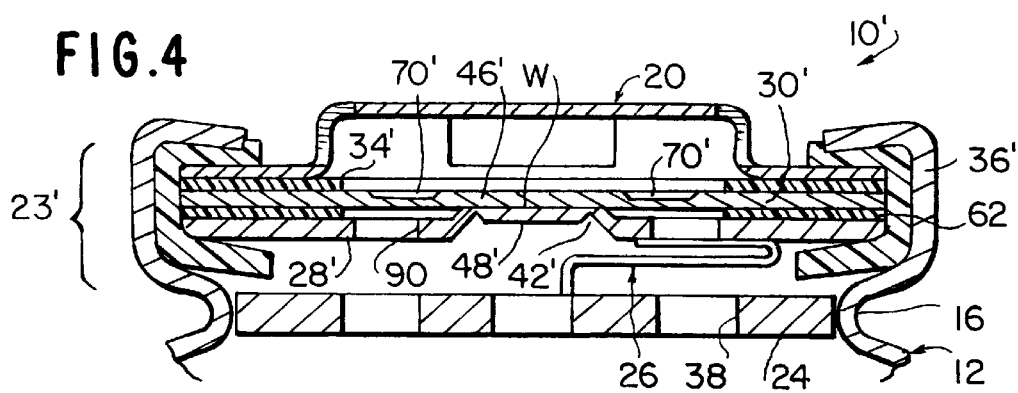
FIG. 4 is a schematic vertical sectional view through a portion of an electrochemical cell illustrating a safety vent valve and electrical disconnect mechanism forming an explosion-proof disconnect assembly constituting a second embodiment of the invention.

FIG. 4 shows a second embodiment of the invention in which like elements to those in the first embodiment of FIGS. 1–3 bear like numerical designations. The explosion-proof electrochemical cell 10' forming the second embodiment of the invention has in like fashion to cell 10 of the first embodiment a vertically upright cell can or container 12 sealed off by an end cap 20 which is perforated to vent the interior of the cell upon rapture of the vent valve disk 30' configured differently from that of the first embodiment. The can 12 within its sidewall 13 adjacent to the top thereof is provided with a can bead 16 below an L-shaped annular soft polypropylene grommet 36 which in similar fashion to the first embodiment is captured between bead 16 and a crimped flange 18 at the top of the can 12. A stack of elements is thus captured by the crimps in the can 12 above a vapor channel forming disk 24 bearing a series of perforations 38. The stack or assembly 23' in this embodiment is formed from the bottom to the top by a modified stripper contact disk 28', an electrical insulative ring or insulator 62 which is interposed between the stripper contact disk 28' and a flat, relatively thin vent valve contact disk 30' adjacent the outer peripheries of those element, a PTC ring 34 essentially identical to that of the first embodiment, and inverted U-shaped end cap 20, again similar to that of the first embodiment. These elements are all fitted within the L-shaped annular grommet 36 identical to that of the first embodiment which takes a U-shaped cross-sectional form by the can crimp flange 18 to form a peripherally sealed assembly.

The modified stripper contact disk 28' while also assisting in maintaining a compact stack 23', unlike the first embodiment has a vertically raised central portion 48 defining a weld area W facing and in direct contact and being welded to the center portion 46' of the overlying vent valve disk 30'. The elements 28', 30' and 34' are of the same diameter. An annular recess 90 is formed in the upper surface of the stripper contact disk 28' from the central weld area 48' radially outwardly to the periphery of the disk 28'. The insulator 62 has a thickness corresponding to that recess and electrically isolates the outer periphery of the contact disk 28' from that of the overlying vent valve disk 30'. Contact is therefore limited between the two disks 28' and 30' at the weld area W. A plurality of radial grooves 70' formed in the upper surface of the vent valve disk 30' at spaced circumferential locations to provide a weakened area permitting the vent valve disk to rapture upon an internal gas pressure at a level higher than that normally causing destruction in the area of weld W between disks 28' and 30', with the severed, weakened portion 48' of the stripper contact disk rupturing from the balance of that disk and being carried away and upwardly from the stripper contact disk 28' proper to effect breaking of the circuit between these components prior to rupture of the vent valve disk 30'. In similar fashion to the first embodiment, the portion 48', which is raised relative to the balance of the stripper contact disk 28', is thinner, and additionally the connection between the periphery of the circular portion 48' and the balance of the stripper contact disk 28' is weakened by either a continuous circular groove within the disk 28', or a series of circumferentially spaced perforations within that member. The operation and action is very similar to that described with respect to the first embodiment, both relative to the sequential breaking of the charging circuit by pulling through the central portion 48' of the underlying stripper contact disk 28' upon excessive pressure internally of the can in the manner of FIG. 2 and then the rapture of the overlying vent valve disk 30' in the area of the grooves 70' within that member at the increasing gas pressure level capable of causing that effect. Additionally, the PTC element 34 acts as it does in the first embodiment by breaking the electrical charging circuit upon a current increase to a predetermined level, acting much like a bimetal switch irrespective of internal gas pressure within the can 12.

Figure 5:
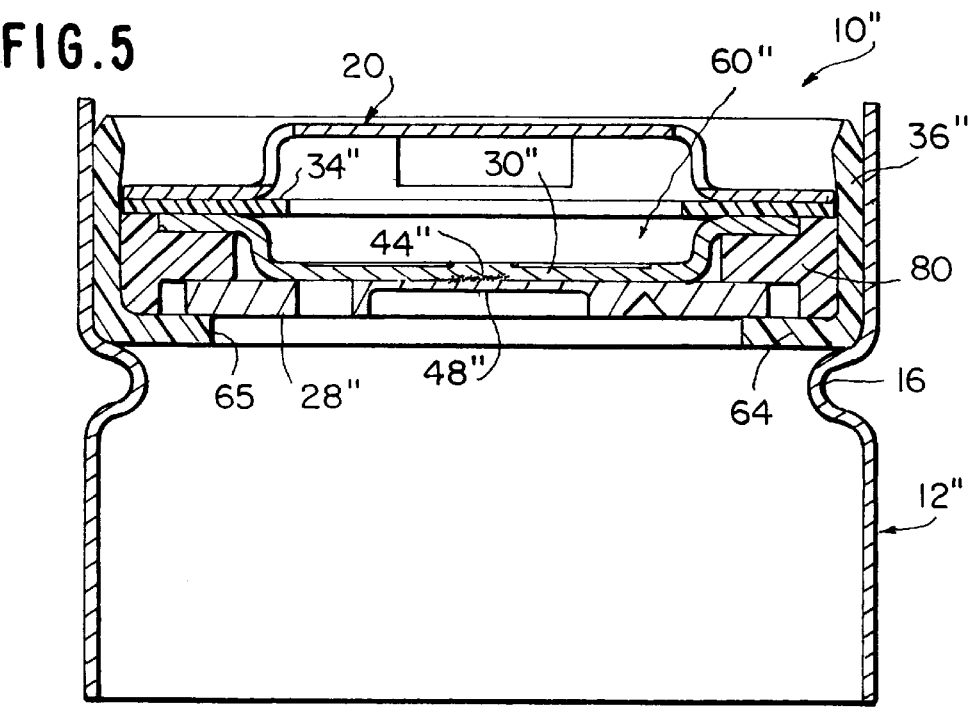
FIG. 5 is a schematic vertical sectional view of an electrochemical cell with a safety vent valve and electrical disconnect mechanism forming yet a third embodiment of the invention.

A third embodiment of the safety valve electronic disconnect for a lithium ion rechargeable electrochemical cell 10" is shown in FIGS. 5–13a, in which schematically FIG. 5 illustrates the primary elements of a combined circuit breaker and safety valve 60" mounted to and within the upper end of can or container 12" by way of a modified L-shaped cup 36" of semirigid plastic. Elements common to the first two embodiments are given like numeral designations. An underlying stripper contact disk is provided at 28". The assembly is completed by the upper two members of the stack, end cap 20, and the PTC element 34, the latter two members being identical to that of the first embodiment of FIG. 1.

FIG. 5 shows essentially the first embodiment prior to crimping of the cell can. The difference between the L-shaped rigid grommet and a T-shaped rigid grommet amounts to a minor design choice. The significant difference in the third embodiment is the new stripper contact disk 28". All discussions about preassembling components within cup 36" apply equally to the preassembly of components within grommet 36 in the first embodiment. Like thickened areas, as at 62a in FIG. 8, are made in both cups 36 and 36" for purposes of providing a snap fit to retain components preassembled within respective cups.

Figure 6:
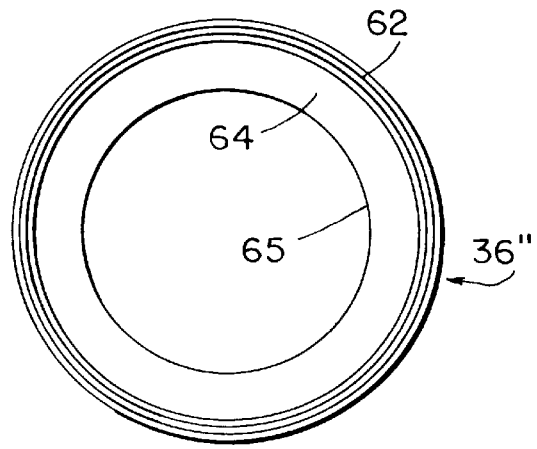
FIG. 6 is a top plan view of a semi-rigid assembly cup forming a component of the cell of FIG. 5.

The assembly is accomplished by first placing a deformable grommet 36 in the filled cell can 16, with the positive electrode tab extended out and welded onto the top vent assembly 60 and the entire assembly stuffed back into the cell can 16 and crimp, in this embodiment, the circuit breaker components are assembled around a rigid annular grommet 80 which fits internally of an assembly cup 36". The can or container 12" has, in common with the first embodiment, a can bead 16, and the top of the can is bent over by crimping of that can top. The assembly cup 36", shown in detail in FIGS. 6, 7 and 8 is of molded polypropylene having initially an L-shaped cross-section including a base 64 and an integral right angle annular sidewall 62. Sidewall 62 includes a thickened portion 62a, FIG. 8, of a width W" slightly in excess of the width W' over nearly the full height of the assembly cup sidewall. The upper end of the sidewall 62 is tapered, having an inwardly oblique outer edge 66 and an oppositely oblique inner edge 68. As may be appreciated, this permits stacking first the specially formed stripper contact disk 28" acting to sandwich one side of the T-shaped cross-section rigid electrically insulative grommet 80 between that member and a specially formed vent valve contact disk 30", above both of which, there resides a thin circular PTC element 34 and the overlying inverted U-shaped end cap 20 having a radially outward flange. Both members 20 and 34 have outer diameters which are on the order of the inner diameter of the thickened portion 62a of the assembly cup 36" sidewall 62. This permits the circuit breaker components 28", 30" to be assembled about or above the rigid grommet 80 and initially held within the L-shaped cross-section annular assembly 36" fitted to the interior of the cell can 12' above the crimp 16, FIG. 4. The assembly cup 36" has a circular opening 65 within its base 64.

FIGS. 9 and 10 show the makeup of the stripper contact disk 28" of the third embodiment, FIG. 5. The disk 28", as shown in the plan view of FIG. 9, includes a plurality of circumferentially spaced holes or openings 40" similar to that of the stripper contact disk 28' of the second embodiment. The new stripper contact disk 28" design uses oval C-shaped slots 40" spaced on a diameter generally equal to the diameter of the circular score line 42". There is a reduced thickness central portion 48" within the bottom of the disk 28' defined partially by a circular score line which ensures that the thickness of the lower stripper contact disk 28" is considerably less than that of the center of overlying vent valve contact disk 30" of FIGS. 11, 12 and 12a. This ensures that a weld nugget 44", FIG. 5, will remain integrated to and rise with the center of vent valve disk 30" during an initial circuit breaker disconnect action similar to that of the first embodiment, with the weld nugget 44" separating from the disk 28" while preferably carrying along a reduced thickness weakened portion 48"a of the stripper contact disk 28". Alternatively, a weld director projection of the central portion 30"e may be struck from disk 28" to rigidify and strengthen the disk 28" at weld point W. The unitary vent valve contact disk 30", FIG. 11, is of cup shape form, having an outer annular flange 30"a and being generally of uniform thickness over its full diameter. It includes a vertically stepped sidewall 30"b intermediate of a central portion 30"c and the radially outer flange 30"a. As shown in the enlarged sectional view of FIG. 12a, a central portion 30"e is formed by a small diameter circular indentation in the top face of the vent valve contact disk 30". Preferably, cruciform score lines 70" radiating outwardly from the outer periphery of the central portion 30"e in the direction of the sidewall 30"b within the upper face of the disk 30' create lines of weakness to facilitate the radial line severance of the disk 30" to effect rupturing of the seal when the vent valve contact disk, employed in the stacked array of FIG. 5, is subject to excessive gas pressure. The disk 30" may be formed of a 1100 series aluminum alloy. Disk 30" is similar, if not identical to disk 30 of the first embodiment.

In this third embodiment, the disconnect assembly 60" incorporates a molded rigid ABS/NYLON or polypropylene rigid grommet 80 of T-shape cross-section, FIGS. 12 and 12a, including a circular sidewall 82 integral with an inwardly projecting central projection 84 of rectangular cross-section. The projection 84 forms a relatively small inside diameter peripheral wall 86 and an outside diameter peripheral wall 88. The vertical height of the annular rigid grommet 80, FIG. 13a, is substantially larger than the thickness of the radially inward projection 84. The outside diameter 88 of the T-shaped cross-section rigid grommet 80 is sized to the inside diameter of the L-shaped cross-section assembly cup 36" within which a stack of elements rests by pressing elements 28", 80, 30", 34 and 20 in ascending order downwardly into the interior of the can or container 12' through the open top and over the thickened terminal portion 62a of the vertical sidewall of the cup shaped assembly cup 36". The rigid grommet alternatively may be of L-shaped cross-section.

In this embodiment, an aluminum tab is preferably prewelded or otherwise attached to the bottom of the stripper contact disk. The separate assembly cup 36" permits ready insertion of the stack of elements into the same prior to crimping of the can 12' top.

As may be appreciated, the several embodiments of the invention therefore provide simplified structures which are compact and have components which are easily manufactured to ensure an excellent, low electrical resistance current path to the positive end cap 20. Further, by providing circumferentially spaced slits within the center of the stripper contact disk adjacent to the weld nugget or by scoring circularly about the weld attachment point, the weld may be maximized while not becoming the ultimate point of electrical disconnect. The adjacent scored and preferably thinner section of the stripper contact disks 28, 28' and 28" achieves a mechanical break similar to that of the $LiSO_2$ vents, with the break at scored section being carefully controlled by varying depths of the score line about the desired area of disconnect.

As may be appreciated from the above description with respect to the three embodiments illustrating the compact nature of the explosion-proof valve disconnect assembly, this invention provides definite advantages in ease of assembly, ease and reliability of the necessary welds between the vent valve contact disk and the underlying stripper contact disk, as well as that between the anode tab and the weld tab integral with and stamped from the stripper contact disk or alternatively welded to the bottom face of the same as significant improvements within this art.

It should be understood that while the foregoing description is directed to several preferred embodiments, modifications may be made to the individual components and components from the respective embodiments may interchanged where appropriate, as well as in the type of material, structural content and stamping of the same without departing from the spirit and scope of the present invention. The foregoing description of the preferred embodiments are illustrative only and the limitations of the present invention are by way of the claims set forth below.

What is claimed is:

1. In a compact electrochemical cell comprising:

a can housing internally a generator unit including an anode, a cathode, a separator separating said anode and cathode, an electrolyte, an explosion-proof valve, electrical disconnect assembly including an explosion-proof vent valve contact disk sealing said can, electrical circuit means including said vent valve contact disk and a juxtaposed stripper contact disk welded thereto at a weld point by a weld nugget electrically connecting one of said anode and said cathode to said vent valve contact disk, and wherein said explosion-proof vent valve contact disk is deformable upon an increase of internal pressure within said can to cause initially electrical separation of the vent valve contact disk from said stripper contact disk at said weld connection to break said electrical circuit prior to rupturing of the valve vent contact disk at a further increased pressurization internally of said sealed can, the improvement wherein:

said vent valve contact disk at said weld point includes a thinned, localized weakened portion within said stripper contact disk for facilitating rupture of said stripper contact disk at said weld point between the weld weakened portion and the center of said juxtaposed stripper contact disk such that said weakened portion of said stripper contact disk separates from the stripper contact disk to open said circuit means.

2. The compact electrochemical cell as claimed in claim 1, wherein said vent valve contact disk has a weld director projection of a thickness significantly greater at said weld point than the welded portion of the stripper contact disk.

3. The compact electrochemical cell as claimed in claim 2, wherein said valve vent contact disk is of uniform thickness and said weld director is a projection stamped outwardly from the center of the vent valve contact disk in the direction of the stripper contact disk to rigidify and strengthen the weld director projection.

4. The compact electrochemical cell as claimed in claim 1, wherein an area within said stripper contact disk about the weld point is weakened such that the rupture of the weld nugget from the stripper contact disk causes the weakened area to sever from the stripper contact disk and to move with the weld nugget and said valve vent contact disk away from the broken stripper contact disk to thereby cut off the electrical circuit therebetween.

5. The compact electrochemical cell as claimed in claim 4, wherein said weakened area of said stripper contact disk is at least formed by a recess within the contact disk about said weld point.

6. The compact electrochemical cell as claimed in claim 1, wherein said stripper contact disk includes an integral stamped part, a weld between said valve vent contact disk for facilitating one of said anode and said cathode and forming one element of said electrical circuit means.

7. The compact electrochemical cell as claimed in claim 1, wherein said explosion-proof valve disconnect assembly housed internally of said can comprises an assembly cup having a flat bottom wall and an integral annular sidewall at right angles thereto about the periphery of the same, an opening within said bottom wall, a rigid annular grommet including an annular sidewall having an outside diameter sized to the inside diameter of the assembly cup and being fitted therein, and a radial projection defining a lower recess on one side thereof, and said stripper contact disk having a diameter sized to the lower recess and being positioned therein, said valve vent contact disk and said stripper contact disk sandwiching said radial projection of said rigid grommet, said explosion-proof valve disconnect assembly further including a circular PTC element overlying said valve vent contact disk and having an outside diameter corresponding thereto, and a metal end cap of U-shaped configuration having an outside diameter corresponding to that of said PTC element and being positioned thereon and forming with said PTC element said sandwich assembly of said valve vent contact disk, said rigid cross-section grommet and said underlying stripper contact disk forming a stacked assembly within said assembly cup at a position defined by said can bead, and wherein said assembly cup includes a deflectable portion of said sidewall at the end of said sidewall remote from said assembly cup bottom wall which is bent over by crimping of said can sidewall to compressively seal off the upper end of said can annular sidewall to complete the assembly of the compact electrochemical cell.

8. The compact electrochemical cell as claimed in claim 7, further including at least one score line within one face of the valve vent contact disk to facilitate rupture of the vent valve contact disk at an internal gas pressure level in excess of an initial gas pressure level, thereby causing rupture of the underlying stripper contact disk by the weld nugget.

9. The compact electrochemical cell as claimed in claim 7, further comprising a recess within a face of said stripper contact disk about the weld point to facilitate rupture of the stripper contact disk without breaking the weld of said weld nugget to said valve vent contact disk to break said electrical circuit upon gas pressurization to said initial level within said cell.

10. The compact electrochemical cell as claimed in claim 9, wherein the stripper contact disk is weakened by a score line within a surface of the stripper contact disk about the weld point facing said vent valve contact disk.

11. The compact electrochemical cell as claimed in claim 1, wherein said stripper contact disk is formed of 1100 series aluminum alloy.

12. The compact electrochemical cell as claimed in claim 7, wherein said vent valve contact disk and said stripper contact disk are formed from 1100 series aluminum alloy.

13. The compact electrochemical cell as claimed in claim 7, wherein said assembly cup is formed of polypropylene and said rigid grommet is formed of one material selected from the group consisting of ABS/NYLON and polypropylene.

* * * * *